United States Patent
Law et al.

(10) Patent No.: US 9,205,963 B2
(45) Date of Patent: Dec. 8, 2015

(54) BIODEGRADABLE MATERIAL

(71) Applicant: Biome Bioplastics Limited, Southampton (GB)

(72) Inventors: Paul William Law, Warwickshire (GB); Tony Longdon, Measham (GB); Daniel Arnillas Perez, Southampton (GB); Maria Begona Gomis Gomis, Southampton (GB)

(73) Assignee: Biome Bioplastics Limited (GB)

( * ) Notice: Subject to any disclaimer, the term of this patent is extended or adjusted under 35 U.S.C. 154(b) by 0 days.

(21) Appl. No.: 14/037,326

(22) Filed: Sep. 25, 2013

(65) Prior Publication Data
US 2014/0087106 A1 Mar. 27, 2014

(30) Foreign Application Priority Data

Sep. 26, 2012 (GB) .................................. 1217209.4

(51) Int. Cl.
| | |
|---|---|
| C08L 3/02 | (2006.01) |
| B65D 65/46 | (2006.01) |
| C08L 3/04 | (2006.01) |
| C08L 3/10 | (2006.01) |
| C08L 67/02 | (2006.01) |
| C08L 77/00 | (2006.01) |
| C08L 101/00 | (2006.01) |

(52) U.S. Cl.
CPC ................. *B65D 65/466* (2013.01); *C08L 3/02* (2013.01); *C08L 3/04* (2013.01); *C08L 3/10* (2013.01); *C08L 67/02* (2013.01); *C08L 77/00* (2013.01); *C08L 101/00* (2013.01); *C08L 2201/06* (2013.01); *Y10T 428/1345* (2015.01)

(58) Field of Classification Search
CPC ............... C08L 3/02; C08L 3/04; C08L 3/10; C08L 67/02; B65D 27/00; B65D 27/04; B65D 65/46; B65D 65/466
USPC ........... 428/34.1–34.3, 35.3, 35.5, 35.7, 36.6, 428/36.92; 524/47
See application file for complete search history.

(56) References Cited

U.S. PATENT DOCUMENTS

| | | | |
|---|---|---|---|
| 5,409,973 A | 4/1995 | Bastioli et al. | |
| 5,412,005 A | 5/1995 | Bastioli et al. | |
| 5,534,150 A | 7/1996 | Bastioli et al. | |
| 2005/0008815 A1* | 1/2005 | Sukigara et al. | ................ 428/98 |
| 2005/0136271 A1 | 6/2005 | Germroth et al. | |

FOREIGN PATENT DOCUMENTS

| | | |
|---|---|---|
| EP | 2042548 A1 | 4/2009 |
| EP | 2380932 A1 | 10/2011 |

* cited by examiner

*Primary Examiner* — Walter B Aughenbaugh
(74) *Attorney, Agent, or Firm* — Craig J. Lervick; Larkin Hoffman Daly & Lindgren, Ltd.

(57) ABSTRACT

A thermoplastic, biodegradable polymer blend having a high surface energy and good adhesion without the need for pretreatment, is made up of starch in the range 10% to 60% by weight of the polymer blend, at least one further carrier polymers in the range 40% to 90% by weight of the polymer blend and one or more process aids in the range 0% to 0.5% by weight of the polymer blend. The polymer blends typically have a surface energy after processing of at least 40 mN/m.

19 Claims, No Drawings

BIODEGRADABLE MATERIAL

The present invention relates to biodegradable material and in particular, but not exclusively, starch based biodegradable materials. More especially, the invention relates to a starch based biodegradable material with enhanced printability and/or glueability.

In recent years a number of bio-plastic based materials have been developed in response to increasing demands for products based on more sustainable materials, which might also be capable of disposal via a composting route after use. This trend has been driven by the need to develop renewable polymers, as in the long term oil-based polymer feedstocks become scarcer and more expensive, and prone to littering the land/seascape.

The use of these bio-plastics has grown strongly, especially in the form of blown or cast film or sheet. In many cases such films need to be surface printed as part of the finishing process, either in-line or off-line. It is natural to couple these sustainable products with water-based ink systems that are seen as offering environmental advantages over traditional solvent or UV inks. This can cause problems in that water-based inks often give poorer bonding to these bio-plastic films, which typically have rather low surface energies. This same issue can also affect bonding to film surfaces with adhesive systems, both water-based and hot-melt. Such adhesion problems are often addressed by pre-treating the film substrate prior to printing, using corona discharge or flame treatments, or chemical surface priming, to raise the surface energy. These approaches require additional equipment to be available and involve extra cost.

Another aspect of these bio-plastics is that they are usually compounded with one or more additives designed for lubrication. Typical additives might include long chain fatty acid esters and amides, long chain fatty acids, waxes etc. Heretofore, the amount of such additives present in these materials has typically been around 1% by weight or higher. At such levels the additive can substantially reduce the surface energy of the resin, and films produced from it.

A further application where a material with improved surface energy would be beneficial relates to multilayer film laminates, where such material can provide improved interlayer adhesion.

A further process where high surface energy is a desirable requirement is the metallization of surfaces by high vacuum deposition techniques, where a high substrate surface energy promotes good adhesion to the typically very thin surface coating of metal, or oxide.

The current invention aims to provide a material that can be processed as a thermoplastic in film blowing or casting, in sheet and tube extrusion, or even in an injection moulded or blow moulded articles.

In its broadest aspect, the present invention provides a thermoplastic, biodegradable polymer blend consisting of starch, and one or more further carrier polymers, and optionally one or more process aids, which shows a high surface energy.

According to one embodiment of the invention, a thermoplastic, biodegradable polymer blend is provided including starch in the range 10% to 60% by weight of the polymer blend, one or more further carrier polymers in the range 40% to 90% by weight of the polymer blend and one or more process aids in the range 0% to 0.5% by weight of the polymer blend, wherein the polymer blend has a surface energy after processing of at least 40 $mNm^{-1}$.

By this invention, we have surprisingly found that reducing the amount of additives from the levels previously used and, in some cases, even eliminating additives altogether from polymer blends including starch and one or more carrier polymers has the unexpected benefit that the surface energy of a starch based biodegradable resin system may be increased to allow easier and more durable surface decoration, especially using water-borne or hot-melt inks, surface coatings and adhesives. The higher surface energy may be intrinsic in the material and may not rely on post-treatment. In particular, very small amounts of a process aid (as defined below) as an additive can produce a polymer blend with enhanced surface energy.

The following terms as used herein are understood to have the following meanings unless the contrary is indicated A process aid is understood to mean a material which acts as an "external" lubricant to the polymer mass, reducing friction at polymer-metal interfaces, reducing any tendencies to melt fracture effects, or to excessive melt adhesion to the surfaces of elements of the processing equipment. Examples of such materials can include fluorocarbon based additives, or conventional fatty acid derived lubricants. Thus, under this definition a process aid is distinct from a compatibilising agent. The latter is typically added in higher amounts to improve miscibility of blended polymers.

A plasticiser is understood to mean a material or mixture of materials added to a polymer or polymer blend to confer additional fluidity and or plasticity. Typically such plasticisers are fairly low molecular weight molecules which lie between the long chain polymer molecules, separating them and increasing polymer mobility. The range of available plasticisers is wide, but typical plasticisers include glycerol, sorbitol, low molecular weight phthalates (e.g. diethyl phthalate), esters (e.g. citrates, adipates) etc. Whilst conferring improved fluidity to the polymer melt and flexibility to the finished product plasticisers suffer a number of drawbacks, including volatility, which affects processing, and a tendency to exudation which can lead to "greasiness" and poor surface adhesion properties in products.

It may be that, where provided, the process aids may be present in an amount ≤0.1% by weight of the polymer blend, and more preferably ≤0.05% by weight of the polymer blend. Where provided the process aids may include, amongst similar materials, calcium, magnesium, and zinc stearates, fatty acid esters and amides, and fatty acid esters of polyhydric alcohols, preferably pentaerythritol fatty acid esters, and most preferably glycerol monostearate. Other materials that have also been found to be very effective as suitable process aids include fluorocarbon based process aids and phospholipids such as lecithin and related derivatives. It may be that the polymer blend contains no process aid. It may be that the polymer blend contains no plasticiser.

It may be that the starch is "native" potato, corn, pea, tapioca, rice or other starches. It may be that the starch is a chemically treated starch or starch derivative of relatively low viscosity, for example chemically treated starches would be oxidised or acid hydrolysed starches. It may be that the starch component consists partially or wholly of a chemically derivatised starch, such as starch esters (e.g. starch acetate) and starch ethers. It may be that the starch or modified starch is present in the range 20%-50% by weight of the polymer blend, preferably 25%-45% by weight of the polymer blend, and most preferably 25%-40% by weight of the polymer blend.

It may be that the biodegradable carrier polymers include aliphatic, aromatic, and linear and branched aromatic/aliphatic copolyesters, and polyamides. In particular such carrier resins, or mixtures thereof, include polybutylene succinate (PBS), polybutylene succinate adipate (PBSA), polyhdroxy alkanoates (PHAs (such as polyhydroxy butyrate (PHB), polyhydroxy butyrate valerate (PHBV), polyhydroxy butyrate co-hexanoate (PHBH), polycaprolactone (PCL), and preferably polybutylene adipate terephthalate (PBAT), most preferably branched PBAT copolyesters such as Ecoflex, produced by BSAF. It may be that the carrier polymer is present in the range 50%-80% by weight of the polymer blend, more preferably 55%-75% by weight of the polymer blend, and most preferably 60%-75% by weight of the polymer.

Thermoplastic biodegradable polymer blends according to the invention may be used for conventional thermoplastic processes including film blowing and casting, sheet and tube extrusion, injection moulding and blow moulding.

use with hot melt adhesives for producing biodegradable/compostable self-sealing envelopes for uses such as courier packaging.

Articles made from the material can be readily printed, painted, or otherwise surface decorated and offer good, durable surface adhesion. The material also offers similarly improved surface characteristics when used with water based and hot melt adhesive systems, e.g. for the attachment of a filmic "window" to a mailing envelope.

The invention will now be described with reference to the example formulations in the following Table in which examples 1 to 10 are formulations in accordance with the present invention and example 11 is a formulation not in accordance with the present invention for comparison.

| Raw material | Unit | 1 | 2 | 3 | 4 | 5 | 6 | 7 | 8 | 9 | 10 | 11 |
|---|---|---|---|---|---|---|---|---|---|---|---|---|
| Native starch (potato) | (% w/w) | 25 | 33 | 33 | | 28 | | | | | | 25 |
| Native starch (tapioca) | (% w/w) | | | | 36 | | 44 | 25 | | | | |
| Acid hydrolysed starch | (% w/w) | | | | | | | | 34 | 25 | 45 | |
| PBAT (standard viscosity) | (% w/w) | 75 | 53.6 | 66.95 | | | | | | | | 75 |
| PBS | | | 13.4 | | 63.98 | 71.95 | 54.98 | | | | | |
| PBAT (low viscosity) | | | | | | | | 75 | 65.95 | 74.95 | 54.98 | |
| Glycerol monostearate * | (% w/w) | | | 0.05 | | | | | 0.05 | | | |
| Oleamide + | (%w/w) | | | | | | | | | | | 1 |
| Fluorocarbon lubricant * | (%w/w) | | | | 0.02 | | 0.02 | | | | 0.02 | |
| Phospholipid lubricant * | (%w/w) | | | | | 0.05 | | | | 0.05 | | |
| Melt flow index (5 kg, 190 C.) ~ | (g/10 min) | 7.7 | 5.5 | 4.4 | 5.1 | 6.6 | 5.0 | 15.7 | 16.6 | 19.2 | 12.4 | 8.1 |
| Film surface tension # | mN/m | 44 | 46 | >44 | 44 | 44 | 44 | >46 | >44 | 46 | 44 | 34 |
| Tensile strength (Machine Direction) ** | MPa | 26.2 | 22.1 | 24.0 | 20.4 | 20.4 | 23.1 | 21.0 | 19.8 | 19.5 | 22.6 | 25.8 |
| Elongation at break (Machine Direction) ** | % | 480 | 380 | 510 | 465 | 465 | 370 | 535 | 375 | 555 | 320 | 520 |

* process aid
+ plasticizer/compatibiliser
~ measured based on the test method described in standards ISO 1133 (2011) and ASTMD 1238
measured based on the ISO 8296 method for measuring surface energy of polyethylene film
** measured according to ASTM D-882-12 (standard test method for tensile properties of thin plastic sheeting It may be that processed articles can be printed in line using water-borne inks, solvent and UV inks with excellent adhesion, scuff and scratch resistance, without the need for pre-treatment. Processed articles may be bonded with an adhesive system such as a hot melt or pressure sensitive to give good adhesive bonding without any pre-treatment. Processed article may be painted or otherwise surface decorated showing good adhesion without any pre-treatment. Processed article may be vacuum coated with metal, oxide, or other coatings, with good adhesion. Finished articles are biodegradable, and may, depending on thickness, be compostable. Finished article may be suitable for direct food contact.

According to another aspect of the invention, a film is provided made from the material of the preceding aspect for The formulations were blended in a co-rotating twin screw compounder. The resulting compounds were converted to a 25 μm film by processing the compounds on a blown film line and the film materials tested for various properties as shown in the Table.

Surface energy also referred to as surface tension was tested using a conventional dyne test pen (to ISO 8296). Dyne pens are very widely used within the printing industry for measuring surface energy and consist of a series of liquid solutions, chosen so that they possess different levels of surface tension. A typical series of solutions might cover surface tension ranges from 30, 32, 34 . . . 48 $mNm^{-1}$. A solution of a known surface tension is spread onto the test substrate. If the surface energy of the test substrate is greater than the surface tension of the liquid then the liquid will spread as a continuous layer on the test substrate and "wet-out" the surface. If the liquid does not wet-out the surface, but reticulates into droplets, then the surface energy of the test substrate is less than the surface tension of the liquid. By testing with a series of solutions the surface energy of the test substrate can be identified, typically to about ±1 mNm$^{-1}$. As can be seen from the Table, the formulation according to the invention (examples 1 to 10) having no or only a small amount of process aid all produce a film material having a surface energy of at least 44 mN/m whereas the comparative formulation (example 11) having a conventional amount of plasticiser/compatibiliser produces a film material having a surface energy of 34 mN/m, a reduction in surface energy of about 25% compared to the formulations according to the invention.

Melt Flow Index was measured according to ISO 1133, using a Davenport MFI-10 machine. Approximately 6 g of polymer were loaded into the instrument, and extruded at 190 C under a load of 5 kg through a standard die (2.095 mm×8.0 mm) to determine the melt flow index data. Mass was determined manually.

The film materials were printed in a water-based flexographic process and tested for surface adhesion by the industry standard "tape test" in which a self adhesive tape was adhered to the surface of each film for 3 minutes, after which the tape was rapidly pulled from the film surface. The film materials produced by the formulations according to the present invention showed no removal of ink from the film surface by the tape whereas the film material produced by the comparative formulation showed more than 50% removal of ink from the film surface by the tape.

The film materials were also tested for adhesion to a conventional ethylene vinyl acetate (EVA) hot melt adhesive system. A pre-coated thin layer of EVA on a PE (polyethylene) envelope was pressed tight against the film, left for 30 seconds, and tested for adhesion. For film materials produced from the formulations according to the present invention the resulting bond could not be split without tearing the film surface of the starch based compound i.e. the bond strength to the EVA was greater than the cohesive tear strength of the starch based film material. In contrast, the film material produced from the comparative formulation peeled easily from the hot melt adhesive layer at a very low peeling force. The bond failed adhesively at the starch based film/EVA interface, with no transfer of adhesive to the starch based film. The improved adhesion provided by the film materials produced by formulations according to the invention may be useful in achieving a partially or fully biodegradable/compostable self-sealing envelope such as used in courier packaging.

It is believed that the higher surface energy of the formulations according to the invention derive from significantly reducing or eliminating the additives present in the formulation, in particular resin formulations consisting of starch dispersed in one or more biodegradable polymers which act as a continuous phase to impart thermoplastic properties to the overall resin. Normally, the additives are designed to facilitate thermoplastic processing, and may also play a role in polymer-polymer compatibilisation. Conventionally, such additives are typically long chain fatty acid esters and amides, fatty acid esters and amides, and fatty acid esters of polyhydric alcohols, long chain fatty acids, waxes etc. and are normally present at levels of around 1.0% by weight or higher.

It has been found in the current invention that surprisingly the amount of additives can be very significantly reduced or even eliminated in the resin mix without compromising compounding and downstream conversion processes. Moreover, as exemplified by the examples such resin formulations show significantly higher surface tension than conventional formulations when converted by film blowing and casting, sheet and tube extrusion, injection moulding, blow moulding, or other thermoplastic conversion processes. In particular, for a thermoplastic, biodegradable starch blend it has been possible to remove completely any additives from the formulation. Such resins can show an increase in surface energy (tension) from ~34 mNm$^{-1}$ up to 40 mNm$^{-1}$, more preferably up to 42-44 mNm$^{-1}$ or even higher, as measured by industry-standard surface tension "dyne pens" (to ISO8296). Additionally, very small amounts of process aid/lubricant, ~0.05%, may be added to such starch based resins whilst still retaining high surface energies. These very low dosings may be useful in particularly critical conversion processes which might impose high shear levels on the molten polymer.

The resin outlined above is typically a blend primarily of starch dispersed in a biodegradable carrier resin which acts as the continuous phase and imparts thermoplastic processability to the blend. The biodegradable polymers added to the starch include aliphatic and aromatic polyesters (e.g. polybutylene succinate, PBS, polybutylene succinate adipate PBSA), linear and branched aliphatic/aromatic copolyesters such as polybutylene adipate terephthalate (PBAT e.g. Ecoflex resins as produced by BASF), polyhydroxy alkanoates (PHAs, e.g. poly-3-hydroxy butyrate, poly-3-hydroxy butyrate valerate), biodegradable polyamides, polycaprolactone PCL, etc. The starch component is typically native starch from sources such as potato, corn, tapioca, rice etc., although chemically modified or derivativised starches are also possible and the term "starch" is used herein to include all of these Such carrier resins described tend to be rather soft, typically with a Shore A hardness around 80. For many applications this is acceptable, but for some end uses a polymer blend with a higher stiffness may be required. In this case it may be necessary to add a stiffer biodegradable resin to the blend. Any resin added to the above polymer blend needs to be carefully controlled to ensure that it does not reduce the surface energy of the overall mixture.

Advantages, benefits and uses of polymer blends according to the invention and processed articles produced therefrom include use for thermoplastic processes including film blowing and casting, sheet and tube extrusion, injection moulding and blow moulding.

printing using water-borne inks, solvent and UV inks with excellent adhesion, scuff and scratch resistance, without the need for pre-treatment.

bonding with a hot melt adhesive system to give good adhesive bonding without any pre-treatment.

painting or otherwise surface decorated with good adhesion without any pre-treatment.

vacuum coating with metal, oxide, or other coatings, with good adhesion.

producing multi-layer laminated product with improved interlayer adhesion biodegradable, and depending on thickness, compostable.

suitable for direct food contact.

The invention is not limited to the exemplary examples and the full scope of the invention is defined in the claims.

The invention claimed is:

1. A thermoplastic, biodegradable polymer blend including starch in the range 10% to 60% by weight of the polymer blend, at least one further carrier polymer in the range 40% to 90% by weight of the polymer blend and at least one process aid in the range 0% to 0.1% by weight of the polymer blend, wherein the polymer blend contains no plasticiser and has a surface energy after processing of at least 40 mN/m.

2. A blend according to claim 1 wherein the surface energy is ≥44 mN/m.

3. A blend according to claim 1 wherein the blend contains no process aid.

4. A blend according to claim 1 wherein said at least one process aid is present at a level ≤0.05% by weight of the polymer blend.

5. A blend according to claim 1 wherein said at least one process aid is selected from the group of materials comprising calcium stearate, magnesium stearate, zinc stearate, fatty acid esters, fatty acid amides, fatty acid esters of polyhydric alcohols, fluorocarbon based process aids, and phospholipids.

6. A blend according to claim 1 wherein the starch is native potato, corn, pea, tapioca, rice or other starches.

7. A blend according to claim 1 wherein the starch is a chemically treated starch or starch derivative.

8. A blend according to claim 1 wherein the starch component consists partially or wholly of a chemically derivatised starch.

9. A blend according to claim 1 wherein said at least one carrier polymer is selected from the group comprising aliphatic polyesters, aromatic polyesters, linear aromatic/aliphatic copolyesters, branched aromatic/aliphatic copolyesters, and polyamides.

10. A blend according to claim 9 wherein said at least one carrier polymer is selected from the group comprising polybutylene succinate (PBS), polybutylene succinate adipate (PBSA), polyhdroxy butyrate (PHB), polyhydroxy butyrate valerate (PHBV), polycaprolactone (PCL), and polybutylene adipate terephthalate (PBAT) and mixtures thereof.

11. A blend according to claim 9 wherein said at least one carrier polymer is a branched polybutylene adipate terephthalate (PBAT) copolyester.

12. A blend according to claim 1 wherein the starch is present in the range 20-50% by weight.

13. A blend according to claim 1 wherein said at least one carrier polymer is present in the range 50-80% by weight.

14. A film material made from the blend of claim 1.

15. A biodegradable/compostable self-sealing envelope produced from the film material of claim 14.

16. A blend according to claim 1 wherein the starch is present in the range 25-45% by weight.

17. A blend according to claim 1 wherein the starch is present in the range 25-40% by weight.

18. A blend according to claim 1 wherein said at least one carrier polymer is present in the range 55-75% by weight.

19. A blend according to claim 1 wherein said at least one carrier polymer is present in the range 60-75% by weight.

* * * * *